United States Patent [19]

Alldredge

[11] Patent Number: 4,696,507

[45] Date of Patent: Sep. 29, 1987

[54] RUNNING BOARD AND TOOLBOX

[76] Inventor: Mark L. Alldredge, 1823 N. University, Lubbock, Tex. 79415

[21] Appl. No.: 892,948

[22] Filed: Aug. 4, 1986

[51] Int. Cl.$^4$ .............................................. B60R 9/02
[52] U.S. Cl. .................................. 296/37.6; 224/42.32
[58] Field of Search ................... 296/37.6; 224/42.41, 224/42.31, 42.32; 312/DIG. 33; 108/44; 280/164 R

[56] References Cited

U.S. PATENT DOCUMENTS

| 1,488,720 | 4/1924 | Tichy et al. | 224/42.41 |
| 3,580,441 | 5/1971 | Zercher | 224/42.31 |
| 4,311,320 | 1/1982 | Waters, Jr. | 108/44 |

Primary Examiner—David A. Scherbel
Assistant Examiner—Carol L. Olson
Attorney, Agent, or Firm—Wendell Coffee

[57] ABSTRACT

A running board toolbox combination is made for pickups and recreational vehicles. The top plate of the toolbox functions as a running board when closed. The toolbox is attached to the vehicle by a flexible sheet upon each end. Each sheet fits the contours of the wheel well to which it is attached. The top plate opens by sliding into a slot at the back of the box. When closed, the top plate is held in place by a lock bolt against the lip at front. Weather stripping between the top plate and the main body of the box keep the box weatherproof. Furthermore, faces depending from the top plate overlap all edges of the box to prevent water from running into the box. Drainage is provided for the water.

9 Claims, 6 Drawing Figures

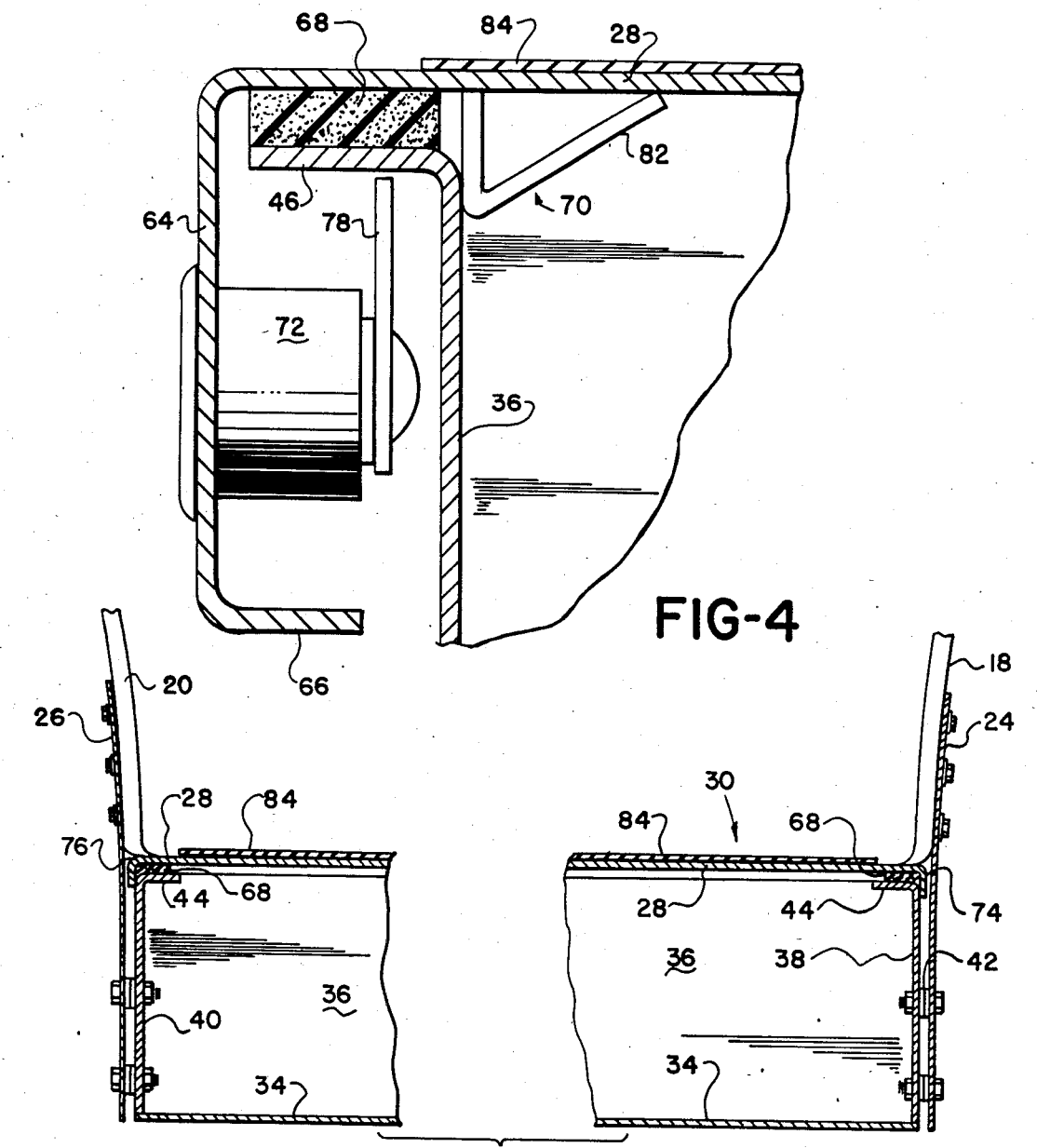
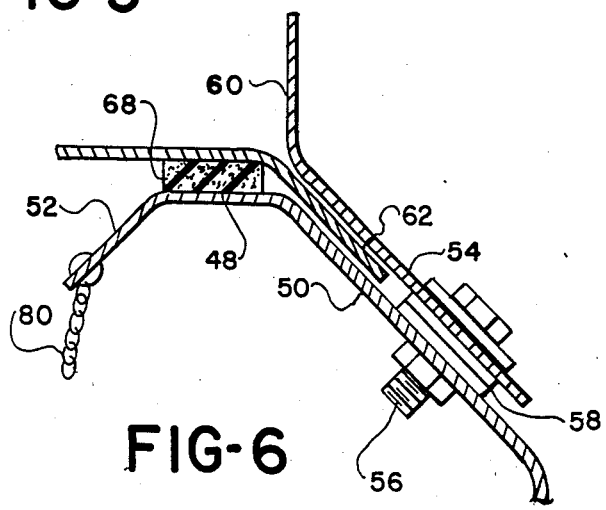

RUNNING BOARD AND TOOLBOX

RIGHTS TO INVENTIONS UNDER FEDERAL RESEARCH

There was no federally sponsored research and development concerning this invention.

BACKGROUND OF THE INVENTION (1) Field of the Invention

This invention relates to land vehicles and more particularly to toolboxes combined with and below the running boards thereof. Those having ordinary skill in this art are the owners of land vehicles.

(2) Description of the Related Art

The personal land vehicles may be characterized as automobiles, pickups, and recreational vehicles. Although automobiles at the present time do not have exterior running boards, pickups and recreational vehicles often have exterior running boards.

Also in America pickups and recreational vehicles are an increasing percentage of the personal vehicles used. There is some indication that they are the major portion of the vehicles sold.

Some pickups and recreational vehicles do not have running boards. Usually running boards are desirable because of the height of the floor board above the road way upon which the vehicles runs.

Although not all of the pickups and recreational vehicles are owned by craftsmen or sportspersons a substantial number are. Normally, people who own pickups or recreational vehicles desire to carry either tools of their craft or equipment for recreation with them.

Therefore, there is a need on this type vehicle for toolboxes. It will be understood that recreation equipment could be stored in the toolboxes as well as the tools of a craft for craftsmen.

Toolboxes under the running boards was a popular consideration over 50 years ago in the early days of the automobile development.

Before this application was filed, a search was made in the U.S. Patent and Trademark Office. Of the 14 patents reported by that search it will be noted that all but one were issued before 1934. The one that was not before 1934 was for a recreational vehicle. (It will be noted that all personal motor vehicles not classified as automobiles or pickups are classified here as recreational vehicles.)

The patents found in the search are listed below.

| | |
|---|---|
| HATFIELD | 1,196,453 |
| VON SCHRENK | 1,310,973 |
| HOLLIS | 1,422,763 |
| LOVELAND | 1,453,362 |
| KERMODE | 1,456,780 |
| TICHY ET AL | 1,488,720 |
| KELLY | 1,530,834 |
| SMITH | 1,628,072 |
| LIMBOCKER | 1,726,398 |
| MOORE | 1,784,971 |
| REINGOLD | 1,850,032 |
| MILLER | 1,864,607 |
| STASSINOS | 1,934,567 |
| GORE | 3,764,048 |

These patents are considered pertinent because the applicant believes the Examiner would consider anything revealed by the search to be relevant and pertinent to the examination of this application.

SUMMARY OF THE INVENTION (1) Progressive Contribution to the Art

I have invented a combination running board and toolbox which is waterproof, dustproof, and sturdy. Also, and more important, it is easily accessible and attractive, correlating with the pleasing contours normally found upon pickups and recreational vehicles. It is particularly designed for ease in manufacturing being primarily composed of broken or bent sheet metal material. It is also designed to be attached primarily to the wheel wells of the vehicle and extend from the front wheel well to the back wheel well beneath the doors of the vehicle.

(2) Objects of this Invention

An object of this invention is to provide a combination running board and toolbox for wheeled vehicles.

Further objects are to achieve the above with a device that is sturdy, compact, durable, lightweight, simple, safe, efficient, versatile, ecologically compatible, energy conserving, and reliable, yet inexpensive and easy to manufacture, install, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 4 is a detail view of the lock, bolt, and holder.

FIG. 5 is a sectional view through one end showing the end and the attachment means, taken on line 5—5 of FIG. 3.

FIG. 6 is a detail view of the back catch, shield, and chain flange.

Figure 1:
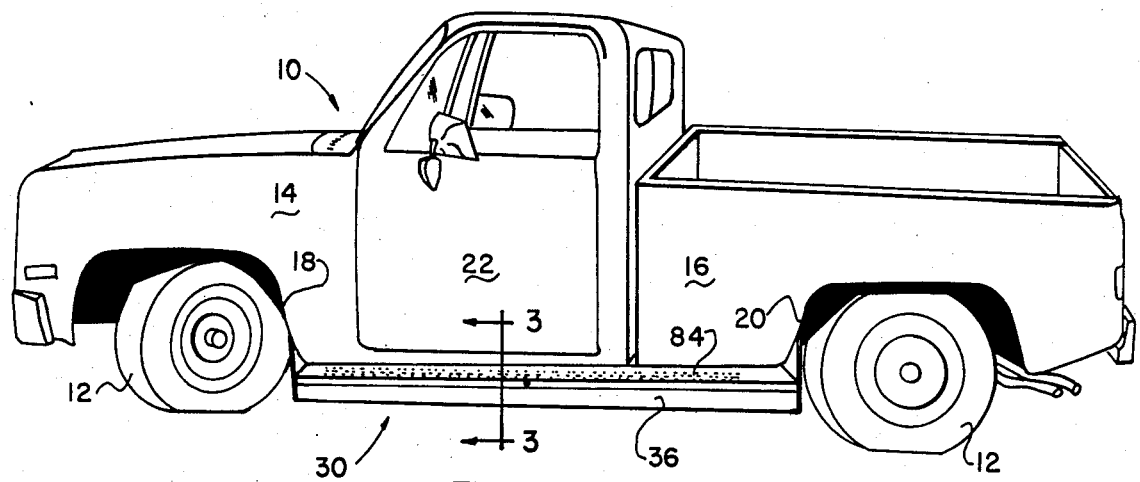
FIG. 1 is a side perspective view of the vehicle with the toolbox according to this invention attached thereto.
Figure 2:
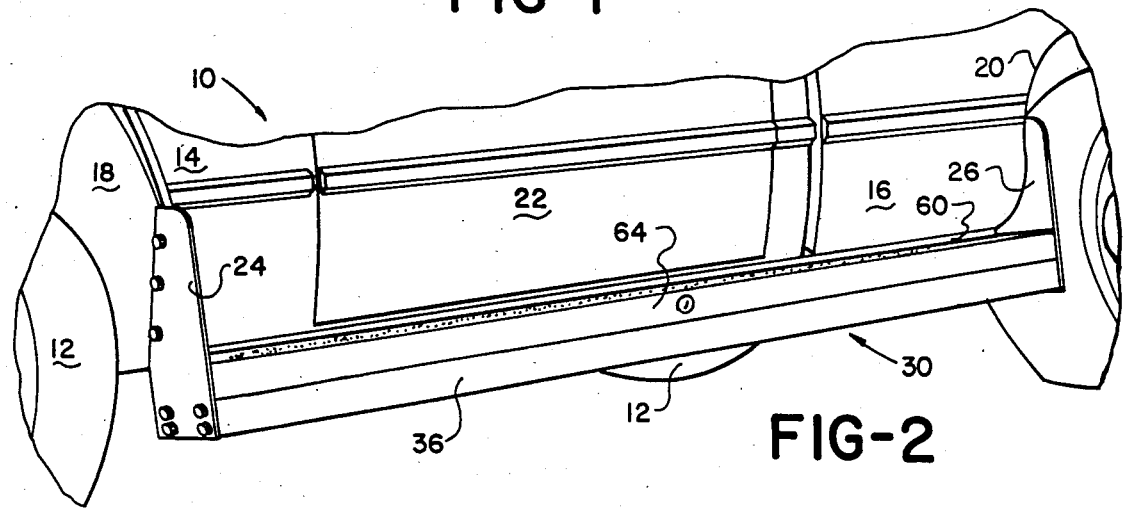
FIG. 2 is a perspective view from the front and side showing the toolbox and the attachment to the wheel well.
Figure 3:
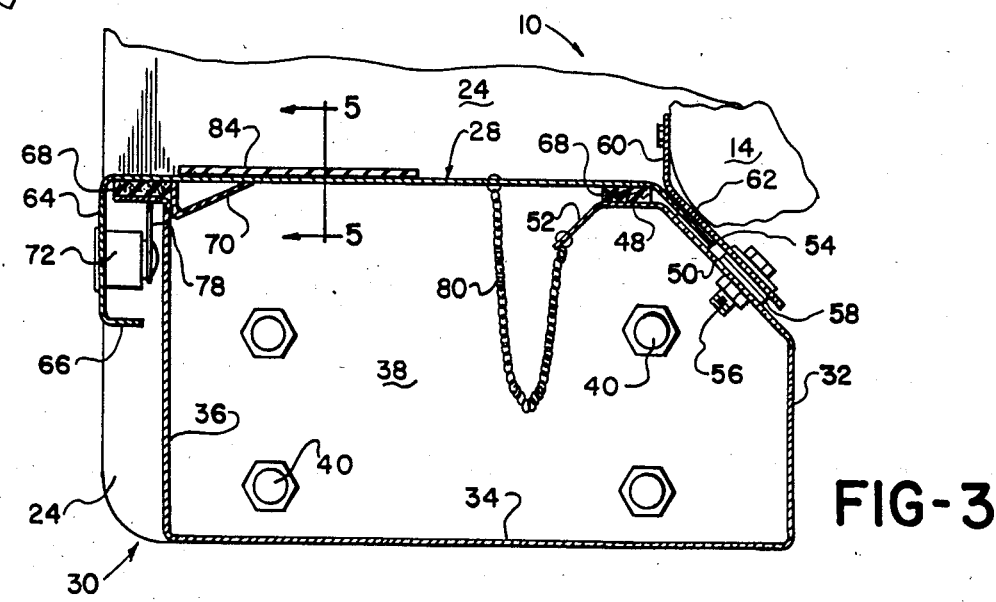
FIG. 3 is a cross sectional view of the box taken substantially along line 3—3 of FIG. 1.

As an aid to correlating the terms describing this invention to the exemplary drawing, the following catalog of elements is provided:

10 vehicle
12 wheels
14 cab
16 bed
18 cab well
20 bed well
22 door
24 front sheet
26 rear sheet
28 top
30 box
32 back
34 bottom
36 side
38 front end
40 rear end
42 end spacers
44 end lips
46 side lip
48 back lip
50 back hip
52 chain flange 54 back shield
56 bolts
58 shield spacers
60 shield flange
62 back catch
64 side face
66 top lip
68 weather stripping
70 holder
72 lock
74 front face
76 rear face
78 lock bolt
80 chains
82 holder slope
84 tread

DESCRIPTION OF THE PREFERRED EMBODIMENTS

Referring to the drawings and more particular to FIG. 1 there may be seen a vehicle 10 in the form of a pickup.

The vehicle will have ground engaging wheels 12. The vehicle will have a body which includes two separate parts. First the cab 14 is mounted to the frame (not shown) in the front and the bed 16 is mounted to the frame to the rear. Inasmuch as the frames of the vehicles are not rigid but have a certain amount of flexibility there is a gap between the cab and the bed to permit a certain amount of flexing. Cab wheel well 18 is mounted on the cab and extends over the front wheel 12. Bed wheel well 20 is part of the body at the bed which extends over the rear wheel 12. As customary the vehicle will have door 22 between the wheel wells.

A toolbox attachment means includes a front splash guard or attachment sheet 24. The attachment sheet is flexible or pliable so that it when applied will conform to the contour of the rear of the cab well 18 as shown. Likewise, the rear of the toolbox is attached by a rear splash guard or attachment sheet 26 which is also flexible to conform to the front of the bed wheel well 20.

In some instances the rear splash guard or attachment sheet 26 will be connected to the cab 14 instead of the bed wheel well. In such cases the box 30 will be short and extend only from the cab well 18 to the rear of the cab.

It will be understood that on different vehicles and makes and brands of vehicle that the contour of the wheel wells will be different. However, I have found that if toolbox 30 is assembled with the sheets 24 and 26 thereon that there is no difficulty in the flexible or pliable sheets 24 and 26 conforming to the contour of the wells wherein they are attached.

Top plate or top 28 of the box 30 is immediately below where the bottom of the wheel well joins the body of the vehicle 10. The top 28 is level from front to back. I prefer to mount the top 28 slightly higher than running boards are normally mounted so that if the box is about 4½ inches deep that it does not project extremely close to the ground. A box which projects about 4½ inches beneath the top 28 will be only about a ½ inch lower than the muffler and exhaust pipes of the vehicle.

The box 30 includes, in addition to the top 28, back panel or back 32 bottom panel or bottom 34, and side panel or side 36. The back 32 and side 36 are normal or 90° to the bottom 34. The back, bottom, and side are formed from a single sheet of metal by braking or bending. The top 28 is a separate piece of metal as are the front end panel or end 38 and rear panel or end 40. The front end and back end are attached to the ends of the back, bottom, and side as by welding.

The attachment sheets 24 and 26 form a means for attaching the box to the wheel wells of the vehicle. The attachment sheets 24 and 26 are conveniently attached to the ends 38 and 40 by bolts and are spaced there from them by one or more end spacers 42.

The top edge of the ends 38 and 40 are bent inward to form end lips 44. The end lips are parallel to the bottom 34. The end lips will be next to the top 28. Side lip 46 is formed by bending the top edge of the side 36 outward. It also will be parallel to the bottom 34 and next to the top 28. Back lip 48 will be made by a brake from a top part of back hip 50 which is made by a brake from the upper edge of the back 32. The back hip 50 will be at a 45° angle to the back 32 and to the back lip 48. The back lip 48 will be next to the top 28 and parallel to the bottom 34.

Chain flange or guide 52 will be formed by a bend at the back lip 48 and will bend downward or into the box 30 by a 45° angle. Back shield 54 is attached to the hip 50 and is parallel thereto. The back shield 54 is conveniently attached by a plurality of bolts 56 and spaced from the hip 50 by washers or shield spacers 58. Shield flange 60 is bent upward from the back shield 54 and is at right angles or normal to the bottom 34.

Back catch 62 on the top 28 is between the shield 54 and the hip 50 and is parallel to each of them. Since it is parallel to the hip, it would be at a 45° angle to the top 28 which is parallel to the bottom 34. Side face 64 on the top 28 extends downward parallel to the side 36. Top lip 66 is bent on the face 64 and extends inward parallel to the bottom 34.

Compressible material in the form of weather stripping 68 is adhered to the underside of the top 28 along the end lips 44, the back lip 48, and the side lip 46. Holder 70 is attached as by welding to the underside of the top 28. It is spaced from the side face 64 distance slightly more than the width of the side lip 46. Therefore with the top 28 in place vertical face of holder 70 (the face parallel to the side 36), will fit against the side 36 and prohibit the top 28 from moving outward or away from the back 32. Gravity as well as lock 72 (to be explained later) prevent the side edge of the top 28 from moving upward. The back catch 62 prevents the back of the top 28 from moving upward.

Front face 74 on the top 28 extends between the front sheet 24 and the front end 38. Rear face 76 upon the top, extends between the rear sheet 26 and the rear end 40. With the top down the top is securely in place. The lock 72 has lock bolt 78 which may bear against the underside of the side lip 46. With the lock bolt 72 bearing against the underside of lip 46, the top 28 cannot be moved upward because of the lock bolt. It cannot be moved outward because of the holder 70. It cannot be moved forward or backward because of faces 74 and 76. Therefore, until the lock 72 is opened by a key (or combination) the contents of the box are secure from theft.

To open the box 30 the bolt 78 is lowered by the key in the lock 72 and the outside edge of the top 28 is moved upward until the lock body 72 contacts the underside of the side lip 46. At this point the holder 70 will be above or clear of the side lip 46. In this position the top 28 can be slid away from the back until the back catch 62 is clear of the back shield 54. At this time, the top is free of the box except for cables or chains 80 which extend from the underside of the top to the chain flange 52. I prefer that the chains be of such a length that they extend from their attachment on the chain flange 52 to the outside edge of the side lip 46. Therefore, they are so arranged so that they will hold the top is a position that gives full access to the box 30 but the top 28 is still in a convenient position. The cables or chains 80 form flexible retainers.

To replace and reconnect the top 28 it is moved into place loosely on the top of the box 30. Then it is slid backward and the back catch 62 will slide under the back shield 54. The top will be guided by chain flange or guide 52. The front side of holder 70 has holder slope 82 which will cause the holder 70 to ride over the side lip 46 so that the top closes naturally and normally.

Suitable tread 84 of antiskid material is applied to the upperside of the top 28 so that when the top of the box 30 is used as a running board it is not slippery. In this regard the top serves two functions. One, is a closure to the toolbox 30 and also as the running board or step to step into the cab of the truck or recreational vehicle.

It will be noted that normally the box 30 is attached to the body of a vehicle by the attachment sheets 24 and 26. In addition to this the shield flange 60 may be bolted to the body of the vehicle below the door 22 of the vehicle.

As mentioned above, there will normally be a certain amount of flexing between the cab 14 and the bed 16. Therefore, it is preferred that the shield flange 60 be bolted to the cab only and not the cab and the bed. However, in certain instances, I have successfully bolted the shield flange 60 to both the cab and the bed.

The shield 54 performs three functions. One it is the holder of the back catch 62 of the top 28. Also it, together with the flange 60, forms the structural member to attach the box to the cab 14 of the vehicle. Also the space between the shield and the hip provides a drainage channel for water to drain from the top.

The top lip 66 functions as a guard for the lock 72 to prevent tampering with the lock.

In this regard the back catch 62 of the top 28 forms at least two functions, that being that it holds the lid down as discussed above and also that it covers the opening in the box to make it waterproof. The space between the ends 38 and 40 and the attachment sheets 24 and 26 forms two functions. One, there is a clearance for the front face 74 and rear face 76 of the top 28 also acts as a water drain between the box and the sheet.

It is well known in the metal working arts particularly with sheet metal that all of the bends, breaks, and turns of the metal give the finished product more rigidity. This is particularly true of the chain flange 52 and the top lip 66 for example. However, the side lip 46 as well as the front end rear faces 74 and 76 also add rigidity to the parts.

The embodiment shown and described above is only exemplary. I do not claim to have invented all the parts, elements, or steps described. Various modifications can be made in the construction, material, arrangement, and operation, and still be within the scope of my invention. The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A toolbox adapted to be attached to a land vehicle having two ground engaging wheels on each side of the vehicle, a body including
   i. a wheel well over each wheel,
   ii. at least one door on each side of the vehicle between the wheel wells;
wherein the improvement comprises:
   a top plate,
   a back panel attached to
   a bottom panel,
   a side panel attached to the bottom panel,
   a front end panel attached to the bottom panel, and
   a rear end panel attached to the bottom panel,
   tread material on the top plate to make it suitable for use as a running board,
   attachment means on each end panel for attaching the end panels and thus the toolbox to the wheel wells of the vehicle,
   end lips formed by bending a top edge of each end panel inward are located next to the top plate and parallel to the bottom panel,
   a side lip formed by bending a top edge of a side panel outward is located next to the top plate and parallel to the bottom panel,
   a back hip formed by bending an upper edge of the back panel inward,
   a back lip formed by bending a top part of the back hip inward, the back lip located next to the top plate and parallel to the bottom panel and the back hip forming about a 45° angle both to the back panel and to the back lip,
   said side panel, bottom panel, back panel, back hip, side lip, and back lip folded from a single sheet of metal with the side panel and back panel normal to the bottom panel,
   a back shield attached to the back hip near the back panel and said shield spaced from the hip,
   a flange on the shield above the top plate and normal to the bottom panel,
   a back catch on the top plate between the shield and hip and parallel to the shield and hip,
   a side face on the top plate extending downward parallel to the side panel,
   a top lip on the side face extending inward parallel to the bottom panel, and
   compressible material in the form of weather stripping attached to the top plate and contacting the end lips, back lip, and side lip.

2. The invention as defined in claim 1 further comprising: a chain flange extending inward and downward from said back lip at a 45° angle so that the chain flange is normal to the back hip.

3. The invention as defined in claim 2 further comprising: two flexible retainers, each having two ends, one of said flexible retainer ends attached to the chain flange, and the other flexible retainer end attached to the to plate.

4. The invention as defined in claim 1 wherein said attachment means includes:
   an attachment front sheet and an attachment rear sheet which are parallel to, spaced from, and attached to said front end panel and back end panel and extend upward,
   said attachment sheets being flexible so they will correlate to a contour of the wheel well.

5. The invention as defined in claim 4 further comprising:

said attachment sheets bolted to said wheel wells so that said toolbox is attached to said vehicle.

6. The invention as defined in claim 4 further comprising:
a front face on the top plate, and
a rear face on the top plate,
said front face between said front end panel and said front sheet,
and the rear face between the rear sheet and rear and panel.

7. The invention as defined in claim 1 further comprising:
a holder attached to an underside of the top plate,
said holder spaced from the side face a distance at least equal to the width of the side lip so that with the top plate in place the top plate is prevented from sliding toward the side panel by the holder.

8. The invention as defined in claim 7 further comprising:
a lock on the side face,
a lock bolt on the lock,
said lock bolt having an engaged position and a disengaged position,
said lock bolt, in the engaged position, bearing against an underside of said side lip.

9. On a land vehicle having
two ground engaging wheels on each side of a body, the body including
  i. a wheel well over each wheel,
  ii. at least one door on each side between the wheel wells;
the improved toolbox attached to the vehicle comprising in combination:
a top plate,
a back panel attached to
a bottom panel,
a side panel attached to the bottom panel,
a front end panel attached to a bottom panel, and
a rear end panel attached to the bottom panel,
tread material on the top plate to make it suitable for use as a running board,
attachment sheets attached to each end panel and parallel to each end panel and spaced from each end panel and extending upward,
said attachment sheets being flexible,
said attachment sheets bolted to said wheel wells,
said attachment sheets correlating to the contour of the wheel so that the toolbox is attached to said vehicle,
end lips formed by bending a top edge of each end panel inward are located next to the top plate and parallel to the bottom panel,
a side lip formed by bending a top edge of a side panel outward is located next to the top plate and parallel to the bottom panel,
a back hip formed by bending an upper edge of the back panel inward,
a back lip formed by bending a top part of the back hip inward, the back lip located next to the top plate and parallel to the bottom panel and the back hip forming about a 45° angle both to the back panel and to the back lip,
a chain flange extending inwardly and downwardly from the back lip at about a 45° angle so that the chain flange is normal to the back hip,
two flexible retainers, each having two ends,
one of said flexible retainer ends attached to the chain flange,
the other flexible retainer end attached to the top plate,
said side panel, side lip, bottom panel, back panel, back hip, back lip, and chain flange folded from a single sheet of metal with the side panel and back panel normal to the bottom panel,
a back shield attached to the back hip near the back panel and said shield spaced from the hip,
a flange on the shield above the top plate and normal to the bottom panel,
said flange bolted to the body of the vehicle,
a back catch on the top plate between the shield and hip and parallel to the shield and hip,
a side face on the top plate extending downward parallel to the side panel,
a top lip on the side face extending inward parallel to the bottom panel,
compressible material in the form of weather stripping attached to the top plate and contacting the end lips, back lip, and side lip,
a front face on the top plate,
a rear face on the top plate,
said front face between the front end panel and the front sheet,
and the rear face between the rear sheet and the rear end panel,
a holder attached to the underside of the top plate,
said holder spaced from the side face a distance at least equal to the width of the side lips of the top plate so that with the top plate in place the top plate is prevented from sliding toward the side,
a lock on the side face,
a bolt on the lock,
said bolt on the lock having an engaged position and disengaged position,
said lock bolt, in the engaged position, bearing against the underside of the side lip.

* * * * *

UNITED STATES PATENT AND TRADEMARK OFFICE
CERTIFICATE OF CORRECTION

PATENT NO. : 4,696,507

DATED : September 29, 1987

INVENTOR(S) : Mark L. Alldredge

It is certified that error appears in the above-identified patent and that said Letters Patent is hereby corrected as shown below:

On the Title Page, Item [76] should read

-- [76]  Inventor:  Mark L. Alldredge
C/O  Robert L. Alldredge
Route 2, Box 15
Floydada, Texas 79235   --.

Signed and Sealed this

First Day of March, 1988

Attest:

DONALD J. QUIGG

Attesting Officer

Commissioner of Patents and Trademarks